(12) United States Patent
Katar et al.

(10) Patent No.: US 9,325,377 B2
(45) Date of Patent: Apr. 26, 2016

(54) POWERLINE COMMUNICATION ADAPTER FOR POWERLINE COMMUNICATION SYSTEMS

(71) Applicant: QUALCOMM Incorporated, San Diego, CA (US)

(72) Inventors: Srinivas Katar, Gainesville, FL (US); Syed Adil Hussain, Cupertino, CA (US); Lawrence W. Yonge, III, Summerfield, FL (US)

(73) Assignee: QUALCOMM Incorporated, San Diego, CA (US)

( * ) Notice: Subject to any disclaimer, the term of this patent is extended or adjusted under 35 U.S.C. 154(b) by 554 days.

(21) Appl. No.: 13/828,390

(22) Filed: Mar. 14, 2013

(65) Prior Publication Data

US 2014/0269952 A1    Sep. 18, 2014

(51) Int. Cl.
*H02J 1/00* (2006.01)
*H04B 3/56* (2006.01)

(52) U.S. Cl.
CPC .......... *H04B 3/56* (2013.01); *H04B 2203/5466* (2013.01); *H04B 2203/5483* (2013.01)

(58) Field of Classification Search
CPC .................................................. H01L 27/0248
USPC ............................................................. 307/1
See application file for complete search history.

(56) References Cited

U.S. PATENT DOCUMENTS

| | | | |
|---|---|---|---|
| 6,741,162 B1 | 5/2004 | Sacca et al. | |
| 6,747,859 B2 | 6/2004 | Walbeck et al. | |
| 7,657,763 B2 | 2/2010 | Nelson et al. | |
| 7,830,248 B2 | 11/2010 | Logvinov et al. | |
| 7,839,012 B2 | 11/2010 | Roblot et al. | |
| 8,144,845 B2 * | 3/2012 | Koga | H04B 3/542 379/90.01 |
| 8,674,539 B1 * | 3/2014 | Magin | H02J 13/0044 307/1 |

\* cited by examiner

*Primary Examiner* — Stephen W Jackson
(74) *Attorney, Agent, or Firm* — DeLizio Law, PLLC

(57) ABSTRACT

A powerline communication adapter may couple powerline communication signals between a network device and a powerline communication network. The powerline communication adapter may comprise of a first electrical connector including an electrical socket and a second electrical connector including an electrical plug. The powerline communication adapter may include a coupling unit coupled between the first electrical connector and the second electrical connector. The coupling unit may be configured to couple a powerline communication signal received via the first electrical connector to the second electrical connector to transmit the powerline communication signal via at least two powerline communication channels in the powerline communication network.

23 Claims, 7 Drawing Sheets

POWERLINE COMMUNICATION ADAPTER FOR POWERLINE COMMUNICATION SYSTEMS

BACKGROUND

Embodiments of the inventive subject matter generally relate to the field of communication networks, and, more particularly, to a powerline communication (PLC) adapter to improve performance of PLC systems.

Powerline communication (PLC) is a wired communication technology that utilizes electrical power wiring for transmitting and receiving communication signals. Certain PLC systems utilize line and neutral wires of electrical outlets for transmitting and receiving communication signals. However, since three wires are typically available in electrical outlets (i.e., Line, Neutral, and Protective Earth or Ground), PLC systems may utilize more than one PLC channel for communication (e.g., to implement PLC diversity techniques). For example, a PLC system may utilize a Line/Neutral channel and a Line/Ground channel. However, certain electrical/electronic devices (e.g., a television, a table lamp, etc.) may only have two-wire connectors (e.g., electrical plugs that only connect to the Line and Neutral wires). Such devices may not be able to utilize all the available PLC channels, even though the electrical wall outlets may have a three-wire socket.

SUMMARY

Various embodiments are disclosed for a powerline communication adapter to couple powerline communication signals between a network device and a powerline communication network. In one embodiment, the powerline communication adapter comprises a first electrical connector including an electrical socket and a second electrical connector including an electrical plug. The powerline communication adapter comprises a coupling unit coupled between the first electrical connector and the second electrical connector. The coupling unit is configured to couple a powerline communication signal received via the first electrical connector to the second electrical connector to transmit the powerline communication signal via at least two powerline communication channels in the powerline communication network.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to a PLC adapter to couple a single PLC device with an electrical socket, embodiments are not so limited. In some implementations, the PLC adapter may allow coupling multiple PLC devices to one or more electrical sockets by including plural implementations of the PLC adapter. In other instances, well-known instruction instances, protocols, structures and techniques have not been shown in detail in order not to obfuscate the description.

Performance of a PLC system can be improved by utilizing multiple PLC channels for communication. For example, in a three-wire (Line/Neutral/Ground) electrical system, multiple PLC channels (e.g., Line/Neutral, Line/Ground, and Neutral/Ground) can be utilized for communication to implement PLC diversity techniques. However, some PLC devices may only include two-wire (Line/Neutral) electrical connectors, which restricts the utilization of multiple available PLC channels. A PLC signal can be coupled from a single PLC channel in a two-wire electrical connector of a PLC device to one or more PLC channels available in a three-wire electrical socket (and vice-versa) to improve the performance of the PLC system.

In some embodiments, a PLC adapter can be configured to couple a PLC signal from a single PLC channel of a two-wire electrical connector (of a PLC device) to two or more PLC channels of a three-wire electrical socket. In the reverse direction, the PLC adapter can also combine PLC signals received on the two or more PLC channels of the three-wire electrical socket and couple a combined signal to the PLC channel of the two-wire electrical connector. The PLC adapter may include a two-wire electrical socket and a three-wire electrical plug. The two-wire electrical connector (e.g., a Line/Neutral connector) of the PLC device can plug into the two-wire electrical socket of the PLC adapter. The three-wire electrical plug of the PLC adapter can plug into a three-wire electrical socket (e.g., a Line/Neutral/Ground electrical socket in an electrical wall outlet). In some embodiments, the PLC adapter may be implemented as a standalone electrical adapter, as will be shown below in FIG. 1. In other embodiments, the PLC adapter may be embedded in a two-wire to three-wire AC cord, as will be shown below in FIG. 2.

Figure 1:
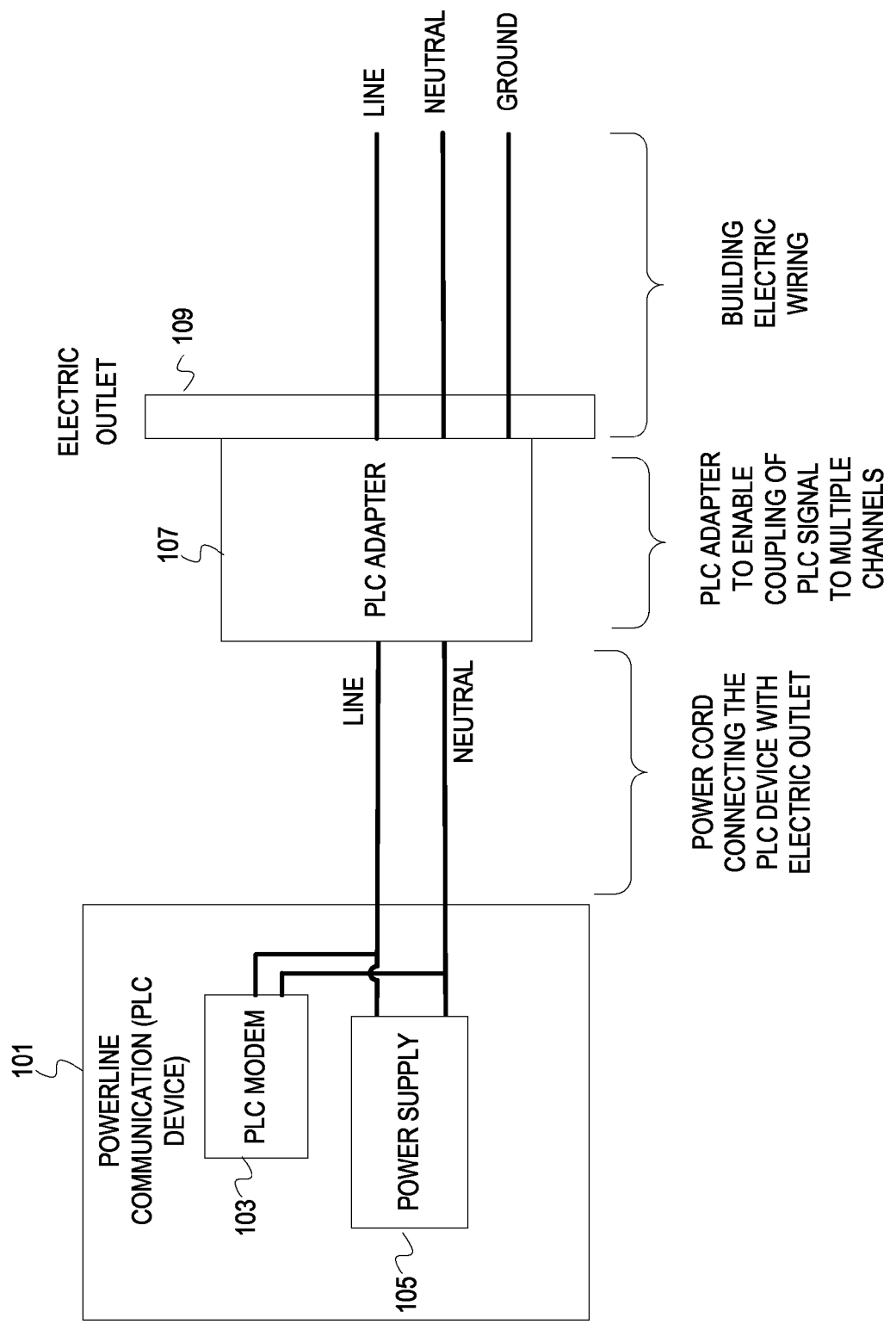
FIG. 1 depicts an example conceptual diagram of a PLC adapter to couple a PLC device having a two-wire connector to a three-wire electrical socket.

FIG. 1 depicts an example conceptual diagram of a PLC adapter to couple a PLC device having a two-wire electrical connector to a three-wire electrical socket. FIG. 1 includes a PLC adapter 107, an electric outlet 109, and PLC device 101 having a PLC modem 103 and a power supply 105. The PLC device 101 may be an electrical/electronic device (e.g., an electric motor, a table fan, a television, a DVD player, etc.). The PLC modem 103 includes one or more hardware or software components (e.g., an encoder, a signal processing unit, a decoder, etc.) to implement PLC for the PLC device 101. The power supply 105 includes one or more components to manage (e.g., regulate, step-up, step-down, etc.) input power to the PLC device 101. The power supply 105 is coupled to a two-wire electrical connector which includes a line wire and a neutral wire. The line and neutral wires of the two-wire electrical connector may also be coupled with the PLC modem 103 for transmitting and receiving PLC signals in a PLC network. The electric outlet 109 may be an electrical wall outlet which includes a three-wire electrical socket and which may be coupled to line, neutral and ground wires of electrical wiring in a building. As illustrated in FIG. 1, the PLC adapter 107 can be coupled with the two-wire electrical connector of the PLC device 101 and the electric outlet 109. The PLC adapter 107 includes a two-wire electrical connector (i.e., a two-wire electrical socket) at one end (to couple with the PLC device 101), and a three-wire electrical connector (i.e., a three-wire electrical plug) at the other end (to couple with the electric outlet 109).

In some implementations, the PLC adapter 107 implements one or more diversity techniques (e.g., utilize multiple PLC channels for transmitting/receiving a PLC signal) to improve the performance of a PLC system. The PLC adapter 107 can couple a PLC signal to be transmitted/received on a plurality of paths (or PLC channels) and improve reliability of the PLC system. The PLC adapter 107 can implement diversity techniques with low power consumption, less complexity, and low costs. For example, the PLC adapter 107 couples a PLC signal transmitted by the PLC modem 103 from a Line/Neutral channel to a Line/Ground channel and a Line/Neutral channel of the PLC network via the electrical outlet 109. The PLC adapter 107 also combines and couples PLC signals received on the Line/Neutral and Line/Ground channels to the Line/Neutral channel of the PLC device 101. The PLC modem 103 can receive and process the PLC signal received on the Line/Neutral channel of the two-wire electrical connector. The PLC signals arriving on the Line/Neutral and the Line/Ground channels of the three-wire electrical socket may have minor variances (e.g., path difference, signal attenuation, etc.) due to variation in channel properties (e.g., channel length, discontinuities, etc.). However, the Line/Ground channel and the Line/Neutral channel are reasonably matched, and the received PLC signals tend to be substantially identical with no significant degradation effects (unless there is a problem in one of the wires of the PLC network).

The PLC adapter 107 may include one or more components to split a PLC signal (received via a single PLC channel) into a plurality of PLC signals (to be transmitted on each of a plurality of PLC channels of the PLC network) and to combine the plurality of PLC signals (received on each of the plurality of PLC channels) into a single PLC signal (to be coupled to the single PLC channel). In some implementations, the PLC adapter 107 may include the components described below with reference to FIG. 3A to split and combine PLC signals. It is noted, however, that the PLC adapter 107 may be configured to split and combine the PLC signals by other techniques and using additional or different components, as will be further described below.

In some implementations, the PLC adapter 107 may transmit/receive the PLC signal on one of the available PLC channels (or on a subset of the available PLC channels). The PLC adapter 107 may utilize one of the PLC channels to transmit/receive the PLC signal. The PLC adapter 107 may utilize one of the PLC channels automatically or based on a user configuration. For example, a user may configure the PLC adapter 107 to utilize one of the available PLC channels of the three-wire electrical socket using a selection switch. The selection switch may allow the user to make a selection for coupling PLC signals to a subset of the available channels, or to all of the available PLC channels. For example, when the neutral wire in a building has low signal-to-noise ratio, a user may selectively disable coupling of the PLC signal to/from the Line/Neutral channel using the selection switch, and instead use the Line/Ground channel.

Figure 2:
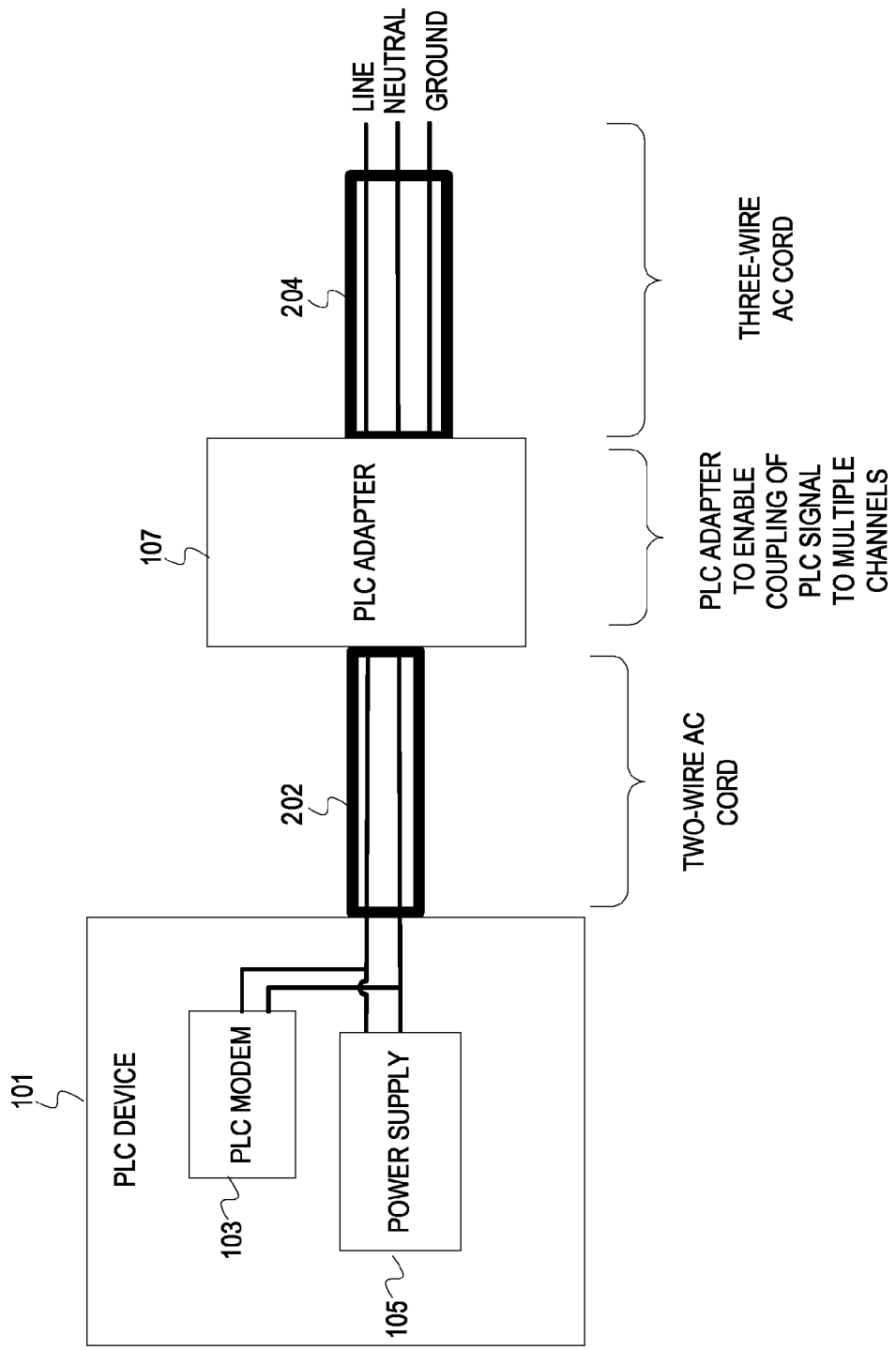
FIG. 2 depicts an example conceptual diagram of a PLC adapter included in an AC cord to enable coupling a PLC device having a two-wire electrical connector to a three-wire electrical socket.

FIG. 2 depicts an example conceptual diagram of a PLC adapter included in an AC cord to enable coupling a PLC device having a two-wire electrical connector to a three-wire electrical socket. FIG. 2 includes the PLC adapter 107, and the PLC device 101 having the PLC modem 103 and the power supply 105 (as described above with reference to FIG. 1). FIG. 2 also includes a two-wire AC cord 202 and a three-wire AC cord 204. The two-wire AC cord 202 may include a line wire and a neutral wire. The line and neutral wires of the two-wire electrical cord may be coupled to the power supply 105 and the PLC modem 103 of the PLC device 101. The two-wire AC cord 202 may include a single Line/Neutral channel for transmitting/receiving PLC signals. The three-wire AC cord 204 may include a line wire, a neutral wire, and a ground wire. The three-wire AC cord 204 may be coupled to a three-wire electrical socket (e.g., an electrical wall outlet, not depicted in FIG. 2 for simplification) via a three-wire electrical connector. The three-wire AC cord 204 may include a Line/Neutral channel, a Line/Ground channel, and a Neutral/Ground channel for transmitting/receiving PLC signals. The PLC adapter 107 can interface the two-wire AC cord 202 with the three-wire AC cord 204. The PLC adapter 107 can couple a PLC signal on the Line/Neutral channel of the two-wire AC cord 202 to the Line/Neutral and Line/Ground channels of the three-wire AC cord 204, which may be coupled with a three-wire electrical socket to transmit the PLC signals via the corresponding Line/Neutral and Line/Ground channels of the PLC network. The PLC adapter 107 can also couple the PLC signals received on the Line/Neutral and Line/Ground channels of the three-wire AC cord 204 to the Line/Neutral channel of the two-wire AC cord 202.

In one implementation, the two-wire AC cord 202 and the three-wire AC cord 204 may be sections of a single continuous electrical cord (i.e., a two-to-three wire AC cord) and the PLC adapter 107 may be embedded in the two-to-three wire AC cord. It is noted that when the PLC adapter 107 is embedded in the two-to-three wire AC cord, the PLC adapter 107 may not include a two-wire electrical socket and a three-wire electrical plug as described in FIG. 1. When the PLC adapter 107 is embedded in the two-to-three wire electrical cord, the line and neutral wires in the two-wire section 202 may be coupled with one or more components (e.g., a primary winding of a coupling transformer as described in FIG. 3A) of the PLC adapter 107. Similarly, the line, neutral, and ground wires in the three-wire section 204 may be coupled with one or more components (e.g., secondary windings of the coupling transformer as described in FIG. 3A) of the PLC adapter 107. In some implementations, when the PLC adapter 107 is embedded in the two-to-three wire electrical cord, the PLC adapter 107 may be embedded in a power block of the two-to-three wire electrical cord. For example, electrical cords for notebook computers and other consumer electronics with PLC communication capabilities may include a power block to perform one or more functions (e.g., step up voltage, step down voltage, regulate current, etc.). The PLC adapter 107 can be embedded in the power block (also known as the power brick) of the electrical cord. For example, one end of the power block may be coupled to the two-wire section 202 (i.e., coupled to the line and neutral wires) and other end of the power block may be coupled to the three-wire section 204 (coupled to the line, neutral and ground wires). The power block may have a two-wire electrical socket at one end to couple with a connector of the two-wire section 202 and the power block may have a three-wire electrical plug at the other end to couple with an electrical connector of the three-wire section 204.

Figure 3A:
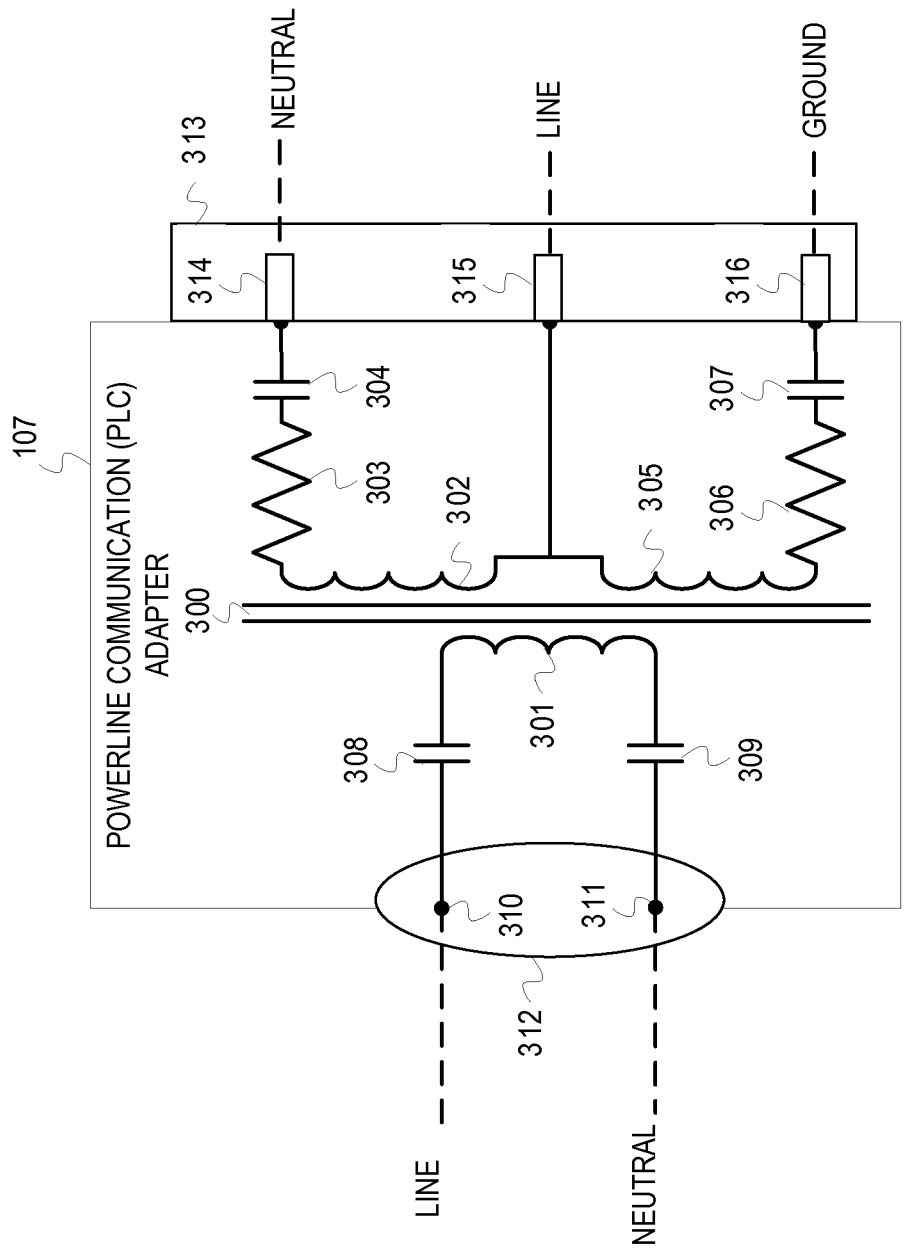
FIG. 3A depicts an example circuit diagram of a PLC adapter.

FIG. 3A depicts an example circuit diagram of a PLC adapter. FIG. 3A depicts certain electrical components of the PLC adapter 107 (shown in FIG. 1) to implement one or more PLC diversity techniques for improving the performance of a PLC system. In one implementation, the PLC adapter 107 includes a coupling unit, e.g., a coupling transformer 300 having a low voltage (or primary) winding 301, a high voltage (or secondary winding 302), and a high voltage (or secondary) winding 305. The primary winding 301 may be coupled to each of the secondary winding 302 and the secondary winding 305 via a transformer core. Each of the primary winding 301, the secondary winding 302, and the secondary winding 305 include two terminals: a first terminal and a second terminal. The secondary winding 302 and the secondary winding 305 share a common terminal. For example, the second terminal of the secondary winding 302 may be common to the first terminal of the secondary winding 305. The PLC adapter 107 may include a two-wire electrical socket 312 at one end, and a three-wire electrical plug 313 at the other end. The two-wire electrical socket 312 may include a first terminal 310 and a second terminal 311. The three-wire electrical plug 313 may include a first terminal 314, a second terminal 315, and a third terminal 316.

In some implementations, the first terminal of the primary winding 301 may be coupled to the first terminal 310 of the two-wire electrical socket 312 via a capacitor 308. The second terminal of the primary winding 301 may be coupled to the second terminal 311 of the two-wire electrical socket 312 via a capacitor 309. The first terminal 310 of the two-wire electrical socket 312 may be coupled to a line wire connection of a PLC device (depicted as a dashed line). Similarly, the second terminal 311 of the two-wire electrical socket 312 may be coupled to a neutral wire connection of the PLC device (also depicted as a dashed line). The capacitors 308 and 309 prevent flow of large currents at low frequency AC (50/60 Hz) to the PLC device.

In some implementations, the first terminal of the secondary winding 302 may be coupled to the first terminal 314 of the three-wire electrical plug 313 via a resistor 303 and a capacitor 304. The second terminal of the secondary winding may be coupled to the second terminal 315 of the three-wire electrical plug 313. The first terminal 314 of the three-wire electrical plug 313 may be coupled to a neutral wire connection of an electrical wall outlet (depicted as a dashed line). Similarly, the second terminal 315 of the three-wire electrical plug 313 may be coupled to a line wire connection of the electrical wall outlet (also depicted as a dashed line). The resistor 303 coupled in series with the first terminal of the secondary winding 302 and the first terminal 314 of the three-wire electrical plug 313 can provide isolation and limits surge currents to the coupling transformer 300. Also, the resistor 303 can help in reducing interaction between a first PLC channel (corresponding to the two terminals of the secondary winding 302), and a second PLC channel (corresponding to the two terminals of the secondary winding 305). The resistor 303 may also reduce loading if one of the PLC channels presents low impedance. The capacitor 304 may help to limit low frequency AC surge currents from the electrical wall outlet to the coupling transformer 300.

In some implementations, the first terminal of the secondary winding 305 may be coupled to the second terminal 315 of the three-wire electrical plug 313. As described above, the first terminal of the secondary winding 305 is common to the second terminal of the secondary winding 302 and may be coupled to the second terminal 315 of the three-wire electrical plug 313. The second terminal of the secondary winding may be coupled to the third terminal 316 of the three-wire electrical plug 313 via a resistor 306 and a capacitor 307. Also, the third terminal of the three-wire electrical plug 313 may be coupled to a ground wire connection of the electrical wall outlet (depicted as a dashed line). The resistor 306 coupled in series with the second terminal of the secondary winding 302 and the third terminal 316 of the three-wire electrical plug 313 may provide isolation and limits surge currents to coupling transformer 300. Also, the resistor 306 can help in reducing interaction between the second PLC channel (corresponding to the two terminals of the secondary winding 305), and the first PLC channel (corresponding to the two terminals of the secondary winding 302). The resistor 306 may also reduce loading if one of the PLC channels presents low impedance. The capacitor 307 may help to limit low frequency AC surge currents from the electrical wall outlet to the coupling transformer 300.

Figure 3B:
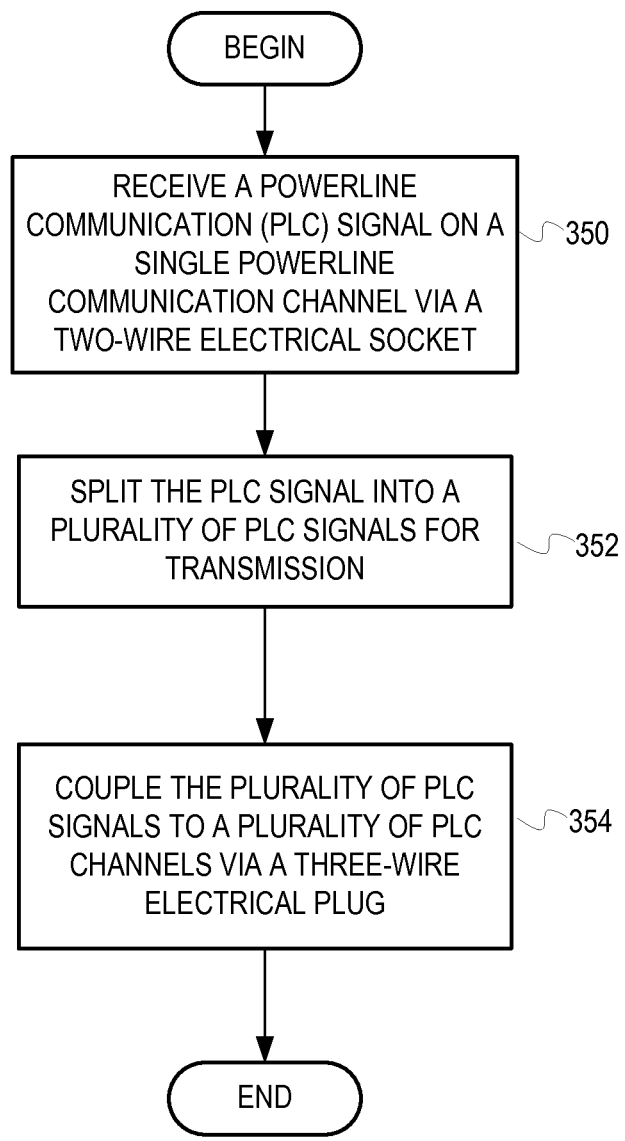
FIG. 3B illustrates a flow diagram of example operations to couple a PLC signal from a single PLC channel to two or more PLC channels using a PLC adapter.

FIG. 3B illustrates a flow diagram of example operations to couple a PLC signal from a single PLC channel to two or more PLC channels using a PLC adapter.

At block 350, the PLC signal is received on the single PLC channel via a two-wire electrical socket. In one implementation, the PLC adapter 107 (as described above with reference to FIG. 3A) receives the PLC signal on the single PLC channel (e.g., a Line/Neutral channel) via the two-wire electrical socket 312. For example, the PLC signal may couple from the Line/Neutral channel to the primary winding 301 of the coupling transformer 300 via the two-wire electrical socket 312. The flow continues to block 352.

At block 352, the PLC signal is split into a plurality of PLC signals for transmission. In one implementation, the PLC adapter 107 splits the PLC signal into the plurality of PLC signals for transmission based on the impedances of the two PLC channels (corresponding to the secondary winding 302 and the secondary winding 305, respectively). For example, the impedances of the two PLC channels are approximately equal and the PLC adapter 107 can split the PLC signal into two signals (a first PLC signal and a second PLC signal) in equal proportions. The flow continues to block 354.

At block 354, the plurality of PLC signals is coupled to a plurality of PLC channels via a three-wire electrical plug. In one implementation, the PLC adapter 107 couples the plurality of PLC signals to the plurality of PLC channels via the three-wire electrical plug 313. For example, the coupling transformer 300 in the PLC adapter 107 may couple the first PLC signal from the secondary winding 302 to a Line/Neutral channel (of an electrical wiring) via the three-wire electrical plug 313. The coupling transformer 300 may also couple the second PLC signal from the secondary winding 305 to a Line/Ground channel (of the electric wiring) via the three-wire electrical plug 313.

Figure 3C:
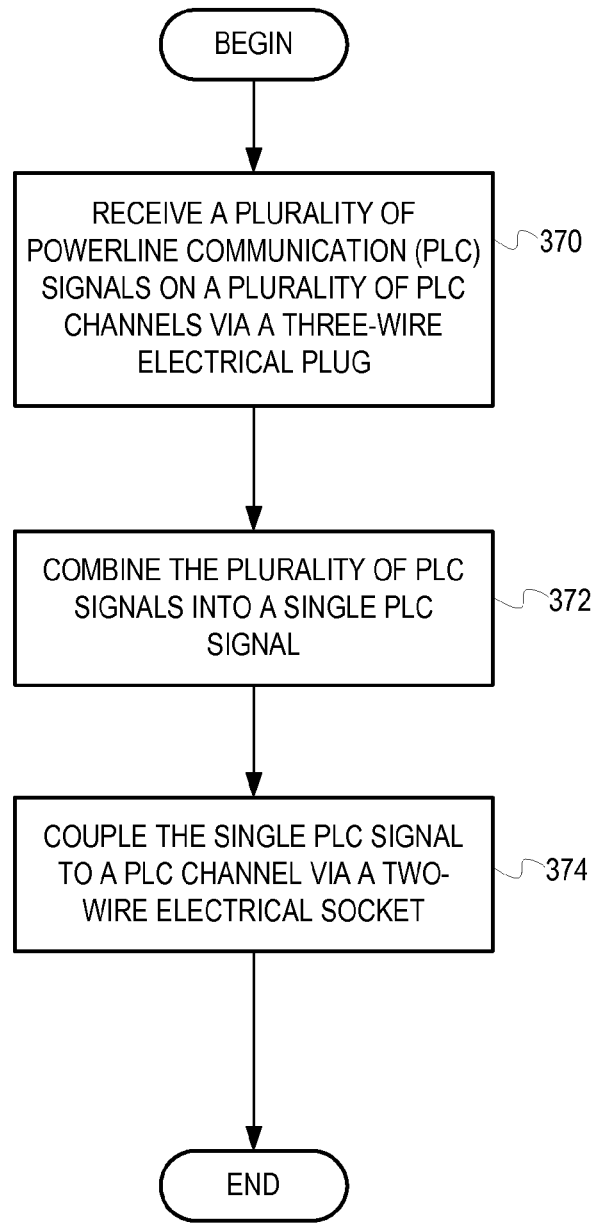
FIG. 3C illustrates a flow diagram of example operations to combine PLC signals received on two or more PLC channels and couple a combined signal to a PLC channel using a PLC adapter.

FIG. 3C illustrates a flow diagram of example operations to combine PLC signals received on two or more PLC channels and couple a combined signal to a PLC channel using a PLC adapter.

At block 370, a plurality of PLC signals is received on a plurality of PLC channels via a three-wire electrical plug. In one implementation, the PLC adapter 107 (as described above with reference to FIG. 3A) receives the plurality of PLC signals at the three-wire electrical plug 313. For example, the PLC adapter 107 may receive a first differential PLC signal at the first terminal 314 and the second terminal 315 of the three-wire electrical plug 313. The PLC adapter 107 may receive a second differential PLC signal at the second terminal 315 and the third terminal 316 of the three-wire electrical plug 313. In one implementation, the PLC adapter 107 receives first and second PLC signals that are substantially identical. For example, the first and second PLC signals may be substantially identical in magnitude and phase. The first and second PLC signals couple to the secondary winding 302 and the secondary winding 305 of the coupling transformer 300, respectively via the three-wire electrical plug 313. The flow continues to block 372.

At block 372, the plurality of PLC signals is combined into a single PLC signal. In one implementation, the PLC adapter 107 combines the plurality of PLC signals into the single PLC signal. For example, the PLC adapter 107 may combine the first and second PLC signals received at the three-wire electrical plug 313 into a PLC signal to be coupled to the primary winding 301. The PLC adapter 107 can combine the first and second PLC signals based on the impedances of the first and second PLC channels (corresponding to the secondary windings 302 and 305, respectively). The flow continues to block 374.

At block 374, the single PLC signal is coupled to a PLC channel via a two-wire electrical socket. In one implementation, the PLC adapter 107 couples the single PLC signal to the PLC channel (e.g., a Line/Neutral channel) via the two-wire electrical socket 312. For example, the PLC adapter 107 can couple the combined PLC signal (combined at block 372) to the primary winding 301 and then to the two-wire electrical socket 312. The combined PLC signal may couple from the two-wire electrical socket 312 to the Line/Neutral channel of a PLC device.

It is noted that FIGS. 3A, 3B, and 3C depict one implementation of the PLC adapter 107. In other implementations, one or more components of the PLC adapter 107 may be modified and/or additional components may be added. For example, the coupling transformer 300 in the PLC adapter 107 may include two primary windings (a first primary winding and a second primary winding) corresponding to each of the two secondary windings 302 and 305. The first terminal 310 of the two-wire electrical socket 312 may be coupled to a first terminal of the first primary winding and a first terminal of the second primary winding. The second terminal 311 of the two-wire electrical socket 312 may be coupled to a second terminal of the first primary winding and a second terminal of the second primary winding. The coupling transformer 300 may couple a PLC signal from the first primary winding to the secondary winding 302. The PLC adapter 107 may also couple a second PLC signal from the second primary winding to the secondary winding 305.

Although, FIGS. 3A, 3B, and 3C illustrate the PLC adapter 107 to couple a PLC signal between a single PLC channel and two PLC channels, embodiments are not so limited. In other embodiments, the PLC adapter 107 may couple a PLC signal between a single PLC channel and more than two PLC channels. For example, the PLC adapter may implement three channel diversity (using Line/Neutral, Line/Ground, and Neutral/Ground channels), N-channel diversity, etc. It is further noted that the PLC adapter 107 is not limited to splitting a PLC signal into a plurality of PLC signals based on impedances of the corresponding PLC channels. Similarly, the PLC adapter 107 is not limited to combining the signals received on the plurality of PLC channels based on impedances of the respective PLC channels. In some embodiments, the PLC adapter 107 may split a PLC signal based on certain user configurations or certain preset conditions. For example, the PLC adapter 107 may couple a PLC signal in unequal proportions to the two PLC channels corresponding to the secondary windings 302 and 305 based on certain preset conditions. Similarly, the PLC adapter 107 may combine a plurality of PLC signals based on certain user configurations or certain preset conditions.

Figure 4:
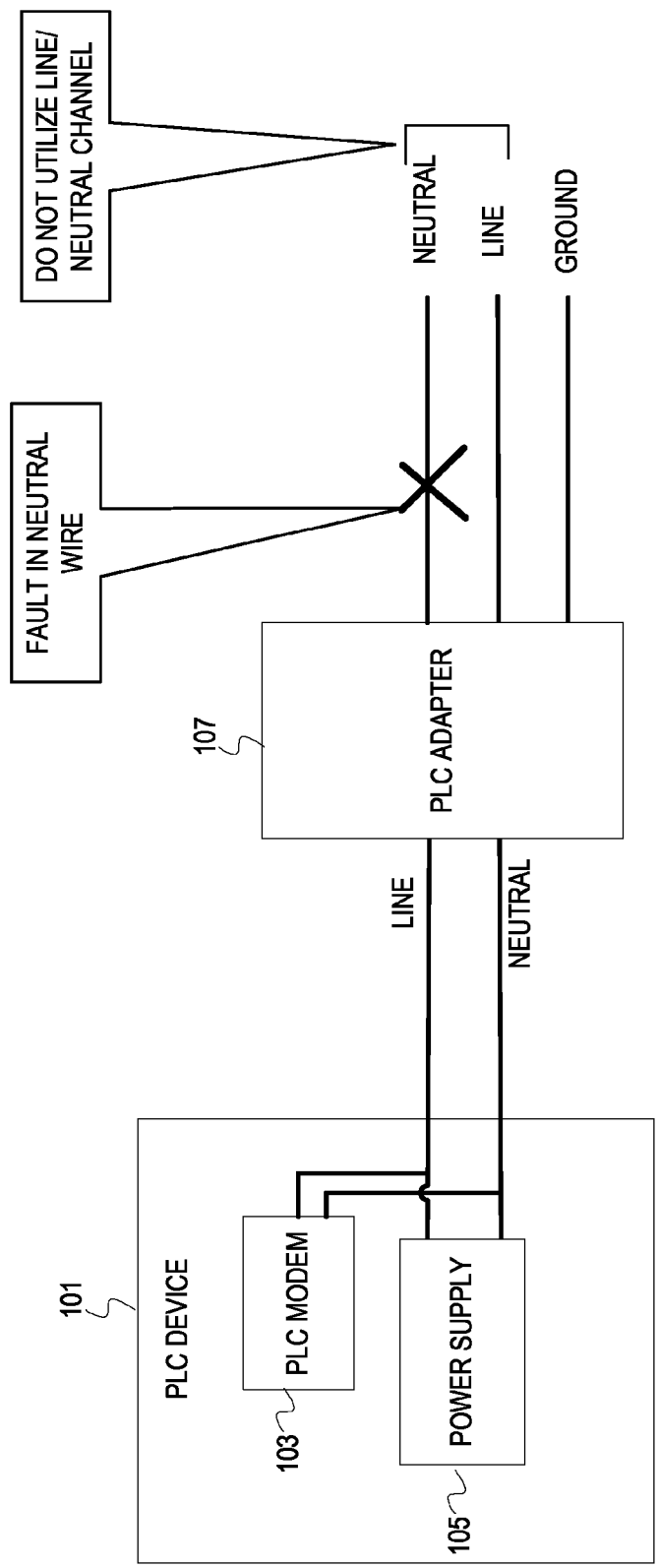
FIG. 4 depicts a PLC adapter to selectively utilize a PLC channel from a plurality of PLC channels based on channel characteristics.

FIG. 4 depicts a PLC adapter to selectively utilize a PLC channel from a plurality of PLC channels based on channel characteristics. FIG. 4 includes the PLC adapter 107 and the PLC device 101 having the PLC modem 101 and the power supply 105. As described above in FIG. 1, the PLC adapter 107 may utilize one of the available PLC channels for communication based on channel characteristics (e.g., signal attenuation, signal-to-noise ratio, etc.). FIG. 4 depicts a fault in a neutral wire of an electric wiring in a building. For example, the neutral wire may be tampered which may lead to high signal attenuation for PLC signals transmitted through the neutral wire. A fault in the neutral wire may cause signal transmissions in the Line/Neutral channel to be corrupted.

In one example, a fault occurs in the neutral wire of the electric wiring in the building. A user may identify the fault at the neutral wire of the electric wiring in the building. For example, the user may identify the fault in the neutral wire when an electrical circuit comprising the line wire and neutral wire is not complete. The user may determine that the Line/Neutral channel offers infinite impedance (e.g., when there is a discontinuity in the neutral wire). In other examples, the user may identify the fault in the neutral wire when the Line/Neutral channel has poor channel characteristics (e.g., the Line/Neutral channel has a poor signal-to-noise ratio due to stray signals coupled to the neutral wire from one or more neighboring devices in the high frequency PLC band). After identifying the fault in the neutral wire, the user may determine that transmissions on the Line/Neutral channel are not feasible.

The user may configure the PLC adapter 107 to not utilize the Line/Neutral channel. In one implementation, the user may only select the Line/Ground channel for communication using the selection switch on the PLC adapter 107. In one example, by selecting the Line/Ground channel, the user may turn off the operation of a secondary winding of a coupling transformer corresponding to the Line/Neutral channel. Therefore, the PLC adapter 107 may only couple a PLC signal from the Line/Ground channel to the PLC device 101 and vice-versa. Similarly, the PLC adapter 107 may not couple a PLC signal received from the PLC device 101 to the Line/Neutral channel and vice-versa. In some implementations, the user may determine whether the fault on the neutral wire has been fixed after a certain time interval. On determining that the fault on the neutral wire has been fixed, the user may configure the PLC adapter 107 to utilize the Line/Neutral and Line/Ground channels for communication using the selection switch. By selecting the Line/Neutral and Line/Ground channels for communication, the user may turn on the operation of the secondary winding of the coupling transformer corresponding to the Line/Neutral channel, and the PLC adapter 107 may begin utilizing both the Line/Ground channel or the Line/Neutral channel.

It is noted that FIG. 4 depicts a fault in the neutral wire only for the purpose of illustration. The fault may occur in one or more of the line, neutral and ground wires. The user may determine not to use a PLC channel for communication based on a fault in one of the wires comprising the PLC channel. For example, when a fault occurs in the ground wire, the user may determine not to utilize the Line/Ground channel for communication. The user may configure the PLC adapter 107 to only couple PLC signals from the Line/Neutral channel to the PLC device 101 and vice-versa.

In some implementations, instead of being manually configured by the user, the PLC adapter 107 may automatically utilize one of the available PLC channels based on channel characteristics. For example, when one of the PLC channels offers low signal-to-noise ratio, the PLC adapter 107 may not utilize the PLC channel, and instead utilize the other available PLC channels. In other implementations, the PLC adapter 107 may interact with one or more components in the PLC device 101 to determine whether to utilize one or more of the available PLC channels for communication. For example, the PLC adapter 107 may include one or more logical circuits to receive input from the PLC device 101. The PLC adapter 107 may receive instructions from the PLC device 101 to selectively couple PLC signals to one or less than all of the available PLC channels. The PLC device 101 may instruct the PLC adapter 107 to not utilize the Line/Ground channel due to poor channel performance. The PLC device 101 may instead instruct the PLC adapter 107 to couple PLC signals to/from the Line/Neutral channel.

It is noted that the PLC adapter 107 in FIGS. 1-4 includes one or more components to simultaneously couple high frequency PLC signals and low frequency AC power signals. For example, the PLC adapter 107 includes one or more components to couple electrical signals at AC power frequencies (e.g., 50/60 Hz) from the three-wire electrical socket of an electrical wall outlet to the two-wire electrical connector of the PLC device 101. The PLC adapter 107 also includes one or more components to couple PLC signals at higher frequencies (e.g., 1.8 MHz-60 MHz) between the two-wire electrical connector of the PLC device 101 and the three-wire electrical socket of the electrical wall outlet. It is further noted that the PLC adapter 107 in FIGS. 1-4 may include one or more components to process a PLC signal before the PLC signal is coupled to/from the PLC device 101. For example, the PLC adapter 107 may include a filter, an amplifier, etc. to filter any signals outside the PLC band and enhance the signal amplitude before the PLC signal is coupled to one or more PLC channels. In some implementations, one or more signal processing components may be included in the PLC device 101. For example, an amplifier in the PLC device 101 may amplify the PLC signal to be coupled to the PLC adapter 107 such that the PLC signal has enough signal power to be coupled to one or more PLC channels.

In some embodiments, the PLC adapter 107 may include more than one electrical socket. For example, the PLC adapter 107 may include one or more two-wire electrical sockets or three-wire electrical sockets in addition to the two-wire electrical socket to couple with the PLC device 101. The additional electrical sockets on the PLC adapter may be utilized to couple electrical/electronic devices to the electrical wall outlet. For example, when the PLC adapter 107 is plugged into an electrical wall outlet, the electrical wall outlet may not be utilized to plug in other electrical/electronic devices. The additional electrical sockets on the PLC adapter 107 may be used to compensate for the occupied electrical wall outlet. The terminals of the additional two-wire electrical sockets may be coupled to line and neutral wires of the three-wire electrical plug of the PLC adapter 107. Similarly, the terminals of the additional three-wire electrical sockets may be coupled to the line, neutral, and ground wires of the three-wire electrical plug of the PLC adapter 107.

Figure 5:
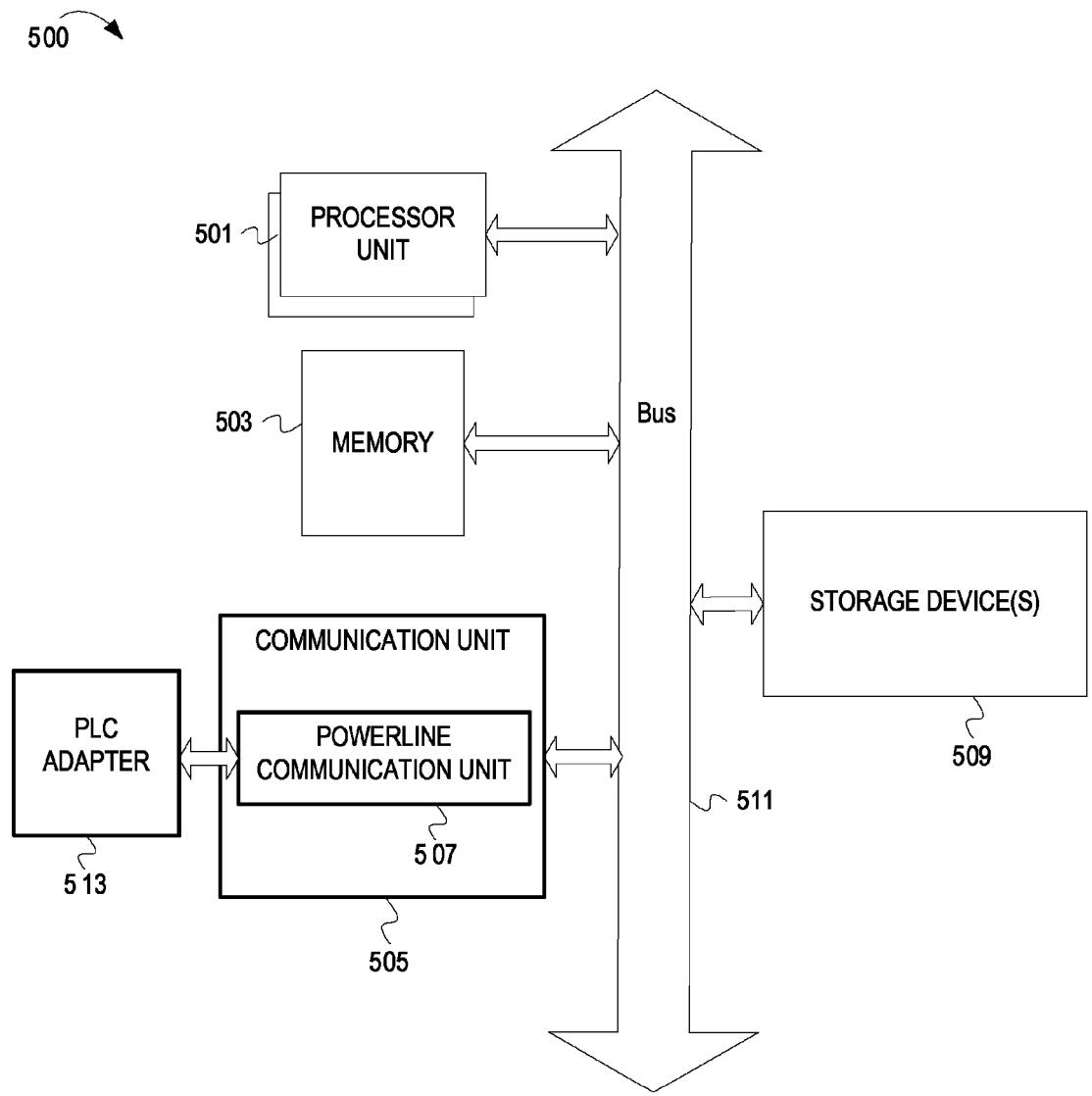
FIG. 5 depicts a block diagram of an example network device.

FIG. 5 depicts a block diagram of an example network device 500. In some implementations, the network device 500 may be one of a desktop computer, laptop computer, a tablet computer, a gaming console, an electric motor, a table lamp, etc. The network device 500 includes a processor unit 501 (possibly including multiple processors, multiple cores, multiple nodes, and/or implementing multi-threading, etc.). The network device 500 includes memory 503. The memory 503 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The network device 500 also includes a bus 511 (e.g., PCI, PCI-Express, AHB™, AXI™, NoC, etc.), a communication unit 505 having a powerline communication unit 507, and a storage device(s) 509 (e.g., optical storage, magnetic storage, network attached storage, etc.). The powerline communication unit 507 may include one or more components (e.g., a modulator, a demodulator, a signal processor, etc.) to implement PLC for the network device 500. The powerline communication unit 507 is coupled to a PLC adapter 513. The PLC adapter 513 includes one or more components (e.g., a coupling transformer, resistors, capacitors, etc.) to couple PLC signals between a single channel of the powerline communication unit 507 and one or more available powerline communication channels, as described above with reference to FIGS. 1-4. The PLC adapter 513 also includes one or more components to simultaneously couple PLC signals between the powerline communication unit 506 and an electrical wall outlet, and AC power signals from the electric wall outlet to the network device 500. In addition to being coupled with the powerline communication unit 507, the PLC adapter 513 may be coupled to a power supply unit of the network device 500. Any one of these functionalities may be partially (or entirely) implemented in hardware or an application specific integrated circuit. Further, realizations may include fewer or additional components not illustrated in FIG. 5 (e.g., video cards, audio cards, additional network interfaces, peripheral devices, etc.). The processor unit 501, the storage device(s) 509, and the communication unit 505 are coupled to the bus 511. Although illustrated as being coupled to the bus 511, the memory 503 may be coupled to the processor unit 501.

While the embodiments are described with reference to various implementations and exploitations, it will be understood that these embodiments are illustrative and that the scope of the inventive subject matter is not limited to them. In general, PLC diversity coupling techniques as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. An apparatus for coupling powerline communication signals between a network device and a powerline communication network, the apparatus comprising:
  a first electrical connector including an electrical socket;
  a second electrical connector including an electrical plug; and a coupling unit coupled between the first electrical connector and the second electrical connector, the coupling unit configured to:
    couple a powerline communication signal received via the first electrical connector to the second electrical connector to transmit the powerline communication signal via at least two powerline communication channels in the powerline communication network; and
    couple a plurality of powerline communication signals received via the second electrical connector to the first electrical connector.

2. The apparatus of claim 1, wherein the electrical socket is a two-wire electrical socket, and the electrical plug is a three-wire electrical plug.

3. The apparatus of claim 2, wherein the coupling unit is configured to couple the powerline communication signal received from the network device via the two-wire electrical socket to a first powerline communication channel and a second powerline communication channel via the three-wire electrical plug.

4. The apparatus of claim 2, wherein a first wire of the two-wire electrical socket is a line wire and a second wire of the two-wire electrical socket is a neutral wire.

5. The apparatus of claim 2, wherein a first wire of the three-wire electrical plug is a neutral wire, a second wire of the three-wire electrical plug is a line wire, and a third wire of the three-wire electrical plug is a ground wire.

6. The apparatus of claim 1, wherein the coupling unit comprises a coupling transformer including a primary winding, a first secondary winding, and a second secondary winding, and wherein the coupling transformer is configured to:
    receive the powerline communication signal from the first electrical connector at the primary winding of the coupling transformer; and
    couple the powerline communication signal from the primary winding to the second electrical connector via at least the first secondary winding and the second secondary winding of the coupling transformer.

7. The apparatus of claim 6, wherein the primary winding comprises a first terminal and a second terminal, and wherein the first terminal is coupled to a first wire of the first electrical connector and the second terminal is coupled to a second wire of the first electrical connector.

8. The apparatus of claim 6, wherein the first secondary winding comprises a first terminal and a second terminal, wherein the first terminal is coupled to a first wire of the second electrical connector and the second terminal is coupled to a second wire of the second electrical connector, wherein the first and second wires of the second electrical connector couple to a first powerline communication channel of the powerline communication network.

9. The apparatus of claim 8, wherein the second secondary winding comprises a first terminal and a second terminal, wherein the first terminal is coupled to the second wire of the second electrical connector and the second terminal is coupled to a third wire of the second electrical connector, wherein the second and third wires of the second electrical connector couple to a second powerline communication channel of the powerline communication network.

10. The apparatus of claim 1, wherein the coupling unit configured to couple the plurality of powerline communication signals received via the second electrical connector to the first electrical connector comprises the coupling unit configured to:
    receive the plurality of powerline communication signals via the at least two powerline communication channels;
    combine the plurality of powerline communication signals into a combined powerline communication signal; and
    couple the combined powerline communication signal to the first electrical connector.

11. The apparatus of claim 1, wherein the first electrical connector includes a two-wire electrical cord with a two-wire electrical socket, and the second electrical connector includes a three-wire electrical cord with a three-wire electrical plug.

12. The apparatus of claim 1, wherein the coupling unit allows coupling of low frequency alternating current power signals and high frequency powerline communication signals.

13. The apparatus of claim 1, further comprising a switch to select whether the powerline communication signal received via the first electrical connector is coupled to the at least two powerline communication channels or to a single powerline communication channel via the second electrical connector.

14. An apparatus for coupling powerline communication signals between a network device and a powerline communication network, the apparatus comprising:
    a first electrical connector including a two-wire electrical socket associated with a first powerline communication channel;
    a second electrical connector including a three-wire electrical plug associated with at least the first powerline communication channel and a second powerline communication channel; and
    a coupling unit coupled between the first electrical connector and the second electrical connector, the coupling unit configured to:
        receive a powerline communication signal on the first powerline communication channel via the first electrical connector;
        couple the powerline communication signal received via the first electrical connector to the first and second powerline communication channels associated with the second electrical connector to transmit the powerline communication signal on each of the first and second powerline communication channels in the powerline communication network.

15. The apparatus of claim 14, wherein the coupling unit is further configured to:
    couple a plurality of powerline communication signals received via the second electrical connector to the first electrical connector.

16. The apparatus of claim 15, wherein the coupling unit configured to couple the plurality of powerline communication signals received via the second electrical connector to the first electrical connector comprises the coupling unit configured to:
    receive the plurality of powerline communication signals via at least the first powerline communication channel and the second powerline communication channel;
    combine the plurality of powerline communication signals into a combined powerline communication signal; and
    couple the combined powerline communication signal to the first electrical connector.

17. An apparatus for coupling powerline communication signals between a network device and a powerline communication network, the apparatus comprising:
    a first electrical connector including a two-wire electrical socket associated with a first powerline communication channel;
    a second electrical connector including a three-wire electrical plug associated with at least the first powerline communication channel and a second powerline communication channel; and a coupling unit coupled between the first electrical connector and the second electrical connector, the coupling unit configured to:
  receive a powerline communication signal on the first powerline communication channel via the first electrical connector;
  couple the powerline communication signal received via the first electrical connector to the second powerline communication channel associated with the second electrical connector to transmit the powerline communication signal on the second powerline communication channel in the powerline communication network, wherein the first powerline communication channel is different than the second powerline communication channel.

18. The apparatus of claim 17, wherein the first powerline communication channel comprises a line-neutral powerline communication channel, and the second powerline communication channel comprises a line-ground powerline communication channel.

19. The apparatus of claim 17, wherein the first powerline communication channel comprises a line-neutral powerline communication channel, and the second powerline communication channel comprises a neutral-ground powerline communication channel.

20. A method for coupling powerline communication signals, the method comprising:
  receiving a powerline communication signal on a single powerline communication channel via a two-wire electrical socket;
  splitting the powerline communication signal into a plurality of powerline communication signals for transmission; and
  coupling the plurality of powerline communication signals to a plurality of powerline communication channels via a three-wire electrical plug.

21. The method of claim 20, wherein a first wire of the two-wire electrical socket is a line wire and a second wire of the two-wire electrical socket is a neutral wire.

22. The method of claim 20, wherein a first wire of the three-wire electrical plug is a neutral wire, a second wire of the three-wire electrical plug is a line wire, and a third wire of the three-wire electrical plug is a ground wire.

23. The method of claim 20, further comprising:
  receiving a plurality of powerline communication signals on the plurality of powerline communication channels via the three-wire electrical plug;
  combining the plurality of powerline communication signals into a combined powerline communication signal; and
  coupling the combined powerline communication signal to the single powerline communication channel via the two-wire electrical socket.

* * * * *